United States Patent [19]

Pamart et al.

[11] Patent Number: 5,408,348
[45] Date of Patent: Apr. 18, 1995

[54] SYSTEM FOR RE-ESTABLISHING THE TRANSMISSION QUALITY OF A LINK INCLUDING AMPLIFIER EQUIPMENTS IN THE EVENT OF FAILURE OF ONE OR MORE AMPLIFIER EQUIPMENTS

[75] Inventors: Jean-Luc Pamart, La Roache Derrien; Francois-Xavier Ollivier, Lannion; Stéphane Morin, Ploubzre; Roland Uhel, Clohars Carnoet, all of France

[73] Assignee: ALCATEL CIT, Paris, France

[21] Appl. No.: 213,061

[22] Filed: Mar. 15, 1994

[30] Foreign Application Priority Data

Mar. 16, 1993 [FR] France ............... 93 03015

[51] Int. Cl.$^6$ ............ H04B 10/08; H04B 10/00
[52] U.S. Cl. ............ 359/110; 359/160; 359/161; 359/177; 359/173; 371/20.2; 370/13.1; 375/211
[58] Field of Search ........... 359/110, 134, 160–161, 359/173–174, 176–177, 179, 341; 372/6; 371/20.2; 370/13.1; 375/3, 3.1; 455/8–10, 50.1, 63, 67.3

[56] References Cited

U.S. PATENT DOCUMENTS

| | | | |
|---|---|---|---|
| 4,604,745 | 8/1986 | Takasaki et al. | 371/20.2 |
| 4,727,601 | 2/1988 | Konishi | 455/612 |
| 5,162,936 | 11/1992 | Taga et al. | 359/177 |
| 5,212,713 | 5/1993 | Erisch | 370/13.1 |
| 5,260,819 | 11/1993 | Hadjifotiou et al. | 359/160 |
| 5,274,496 | 12/1993 | Fujiwara et al. | 370/13.1 |

FOREIGN PATENT DOCUMENTS 2206461 1/1988 United Kingdom.

OTHER PUBLICATIONS

Takuya Iwakami et al, "Optical Data Highway Using Error–Free Bypassing Technique", *NEC Research And Development*, No. 66, Jul. 1982, pp. 16–24.
Japanese Patent Abstract JP 59190735 dated Oct. 29, 1984.
Japanese Patent Abstrat JP2155323 dated Jun. 14, 1990.
French Search Report FR 9303015.

*Primary Examiner*—David K. Moore
*Assistant Examiner*—Kinfe-Michael Negash
*Attorney, Agent, or Firm*—Sughrue, Mion, Zinn, Macpeak & Seas

[57] ABSTRACT

A system for re-establishing the transmission quality of a digital information transmission link including amplifier equipments in the event of failure of one or more amplifier equipments includes, associated with at least one of the amplifier equipments, a gain control device for varying the gain of the amplifier equipment in order to compensate for deterioration of the receive signal-to-noise ratio following failure of at least one other amplifier equipment. An error corrector coder at the send end of the link operates on the digital information to be transmitted and an error corrector decoder at the receive end of the link operates on the received digital information. The error corrector code used by the error corrector coder and decoder reduces or eliminate residual errors at the receiving end associated with residual deterioration of the receive signal-to-noise ratio not compensated by varying the gain.

2 Claims, 2 Drawing Sheets

SYSTEM FOR RE-ESTABLISHING THE TRANSMISSION QUALITY OF A LINK INCLUDING AMPLIFIER EQUIPMENTS IN THE EVENT OF FAILURE OF ONE OR MORE AMPLIFIER EQUIPMENTS

BACKGROUND OF THE INVENTION

1. Field of the Invention

The present invention is generally concerned with the reliability of information transmission links and is more particularly concerned with a system for reestablishing the transmission quality of a link including amplifier equipments in the event of failure of one or more amplifier equipments.

Amplifier equipments in this context can be either intermediate amplifier equipments known as repeaters and disposed at regular intervals on a link to compensate the attenuation of the signals conveying said information by virtue of their transmission on the link or amplifier equipments provided at one or both ends of the link to provide the correct send and/or receive level.

2. Description of the Prior Art

A known way to re-establish the transmission quality of a link in the event of failure of one of the equipments constituting it is the automatic replacement of the defective component of the equipment, that which has caused it to fail, with another, non-defective component, said equipments comprising redundant components to allow this.

A solution of this kind is used in the case of submarine links as there is then no need to access said equipments directly, but a drawback of redundancy is the increased cost and size of the equipment.

An object of the present invention is a system for re-establishing the transmission quality of a digital information transmission link including amplifier equipments in the event of failure of one or more equipments which is applicable in particular to the case of submarine links, especially optical links, avoiding this problem.

SUMMARY OF THE INVENTION

The present invention consists in a system for re-establishing the transmission quality of a digital information transmission link including amplifier equipments in the event of failure of one or more amplifier equipments, characterized in that it includes:
associated with at least one of said amplifier equipments, means for varying the gain of said amplifier equipment in order to compensate for deterioration of the receive signal-to-noise ratio following failure of at least one other amplifier equipment,
error corrector coding means at the send end of said link operating on the digital information to be transmitted and error corrector decoding means at the receive end of said link operating on the received digital information, the error corrector code used by said error corrector coding means and by said error corrector decoding means being adapted to reduce or even eliminate residual errors at the receiving end associated with residual deterioration of the receive signal-to-noise ratio not compensated by varying the gain.

Other objects and features of the present invention emerge from the following description of one embodiment of the invention as applied to an optical link given by way of example and with reference to the accompanying drawings.

DETAILED DESCRIPTION OF THE PREFERRED EMBODIMENT

Figure 1:
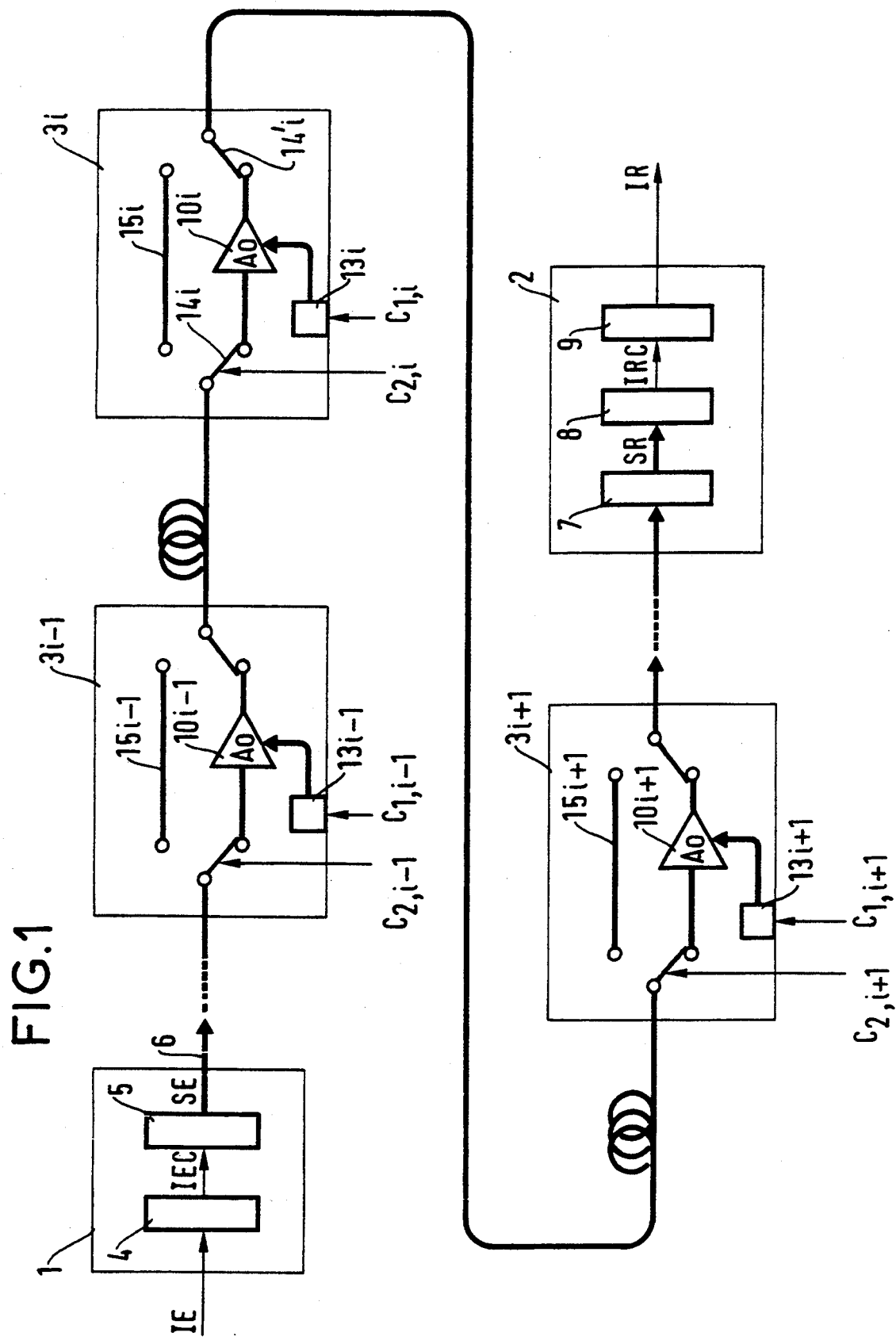
FIGS. 1 and 2 are block diagrams showing a transmission link provided with a system according to the present invention, FIG. 1 showing this link with no amplifier equipment failure and FIG. 2 showing it when one of said amplifier equipments has failed.
Figure 2:
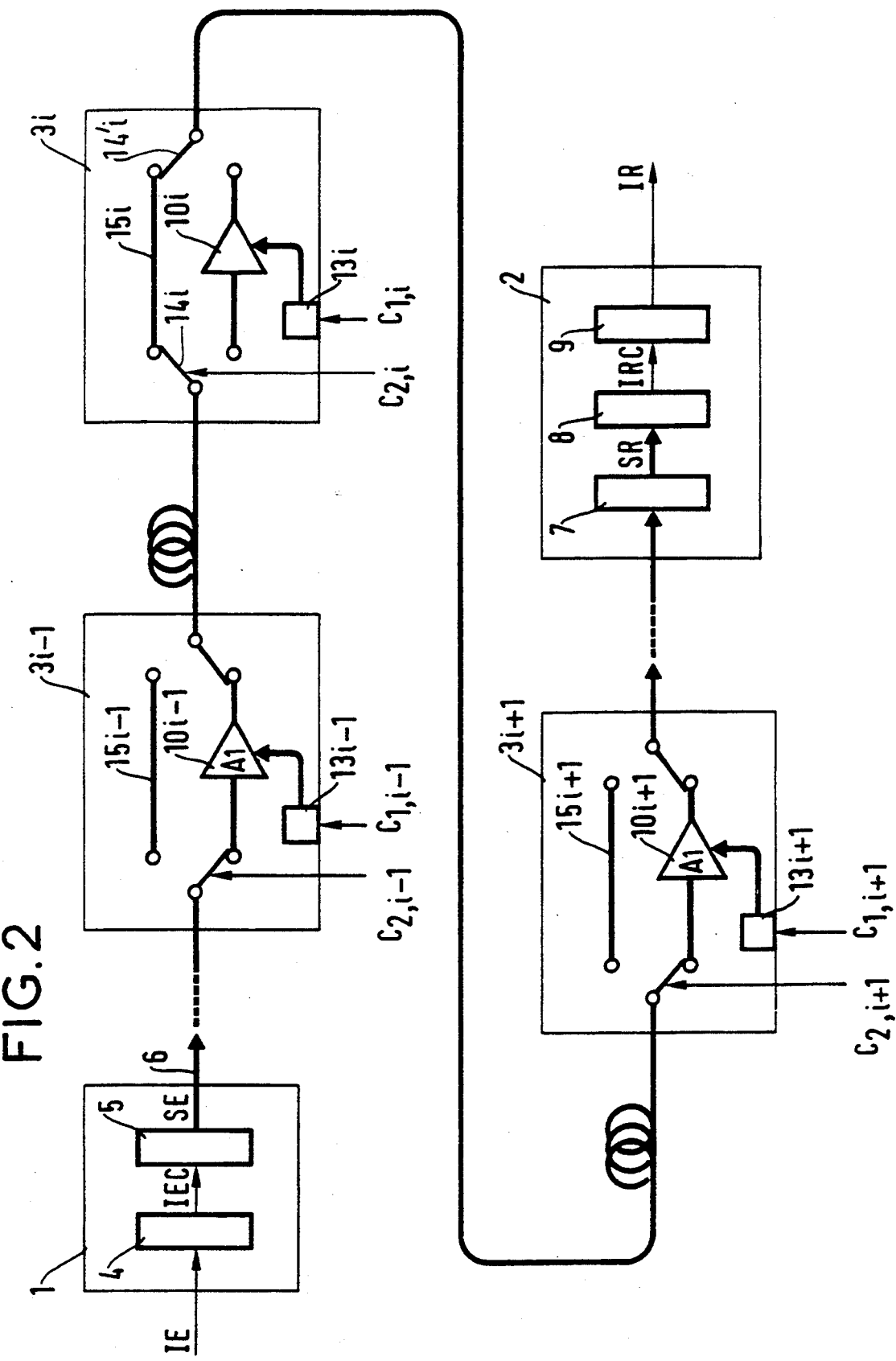

The transmission link shown in FIGS. 1 and 2 includes a send end terminal equipment 1, a receive end terminal equipment 2 and a set of intermediate equipments or repeaters of which three ($3_{i-1}$, $3_i$ and $3_{i+1}$) have been shown in the figures by way of example.

Each intermediate equipment $3_i$, etc includes an amplifier equipment $10_i$, in this example an optical amplifier equipment. Although this is not specifically shown, either or both terminal equipments could also include such amplifier equipments.

The send end terminal equipment 1 includes error corrector coding means 4 receiving digital information IE to be transmitted.

The error corrector coding means can employ an error corrector code such as a block linear code like the B.C.H. (Bose Chaudhuri-Hocquenghem) or Reed-Solomon code, or a convolutional code, or a concatenation of several such codes, identical or different, descriptions of which can be found in the literature.

The send end terminal equipment 1 further comprises in the present example of an optical link an optical sender 5 which receives the information IEC from the error corrector coding means and produces an optical signal SE transmitted on an optical fiber 6. The optical sender 5 includes an electro-optical transducer and optionally means for formatting the digital information to be transmitted received from the error corrector coding means into a form suitable for transmission on an optical link.

The receive end terminal equipment 2 includes an optical filter 7 to reject optical noise generated by the optical amplifier equipments and so increase the signal-to-noise ratio.

The optical signal SR at the optical filter output is applied to an optical receiver 8 which outputs digital information IRC applied to error corrector decoding means 9 using the same code as the error corrector coding means 4.

The optical receiver 8 includes an opto-electronic transducer, decision means and optionally means for converting the digital information from the format for transmission on the optical link to the initial format.

In this example of an optical link said optical amplifier equipments can be doped fiber optical amplifiers, for example, or semiconductor optical amplifiers. In the case of doped fiber optical amplifiers, for example, an amplifier equipment includes a portion of fiber doped with rare earth ions (erbium ions, for example) associated with a pump optical source feeding a pump optical signal into the doped fiber portion to enable optical amplification and to set the gain of such optical amplification. In this example amplifier equipment failure is due to failure of the pump optical source.

Each intermediate equipment $3_i$, etc includes, in addition to the amplifier equipment $10_i$, amplifier equipment gain control means $13_i$ which varies the gain in the event of failure of another amplifier equipment on the link in order to compensate for the deterioration of the receive signal-to-noise ratio following such failure.

In this example of doped fiber optical amplifier equipments said gain control means can be means for modifying appropriately the electrical signal controlling the pump optical source.

According to the invention, in the event of failure of an amplifier equipment the gain of at least one other amplifier is varied to compensate for the deterioration in the signal-to-noise ratio following such failure. The number of amplifier equipments whose gain is varied in this way and their location on the link relative to the failed equipment can be left to the discretion of the operator and determined experimentally, for example, or by simulation, there being multiple possibilities in each situation rather than a single solution.

In the example shown in FIG. 2, representing failure of amplifier equipment $10_i$, the gain of the amplifier equipments $10_{i-1}$, $10_{i+1}$ is therefore increased to a value $A_1$ which is greater than the value $A_0$ for the case as shown in FIG. 1 in which no amplifier equipment has failed.

In the embodiment shown in the figures each intermediate equipment $3_i$, etc further includes means for selectively taking an amplifier equipment out of service entirely, in particular in the event of total failure of the amplifier equipment $10_i$, and replacing it with a portion of fiber $15_i$. In this example these means include two optical switches $14_i$, $14'_i$. In the FIG. 2 example the switches $14_i$ and $14'_i$ are operated to disconnect the amplifier equipment $10_i$ from the link.

The error corrector code used on the link can reduce or even eliminate residual errors at the receive end associated with residual deterioration of the receive signal-to-noise ratio, i.e. deterioration which has not been compensated by varying the gain and which cannot be completely compensated by varying the gain because the link would then have a downgraded rating relative to the nominal rating for which it was designed and which guarantees at the receiving end an error rate of not more than the maximum error rate specified by the user.

The nominal rating is a consequence of information transmission theory which shows that, for a link incorporating intermediate amplifier equipments, and assuming identical, equidistant intermediate amplifier equipments, each exactly compensating the attenuation due to the uplink section of line, i.e. assuming so-called unit gain steps (a step being defined as an intermediate amplifier equipment and the line section on its uplink side), there is a relationship between the receive signal-to-noise ratio and some characteristic link parameters, for example the number of steps and the step length (increasing the number of steps or the step length increasing the error rate, all other factors being unchanged): see for example "Systèmes de Télécommunications-Bases de transmission" (Telecommunication Systems-Transmission Basics")—P.G. FONTOLLIET—Collection Technique et Scientifique des Télécommunications—DUNOD.

In the present example of amplifier equipment failure(s), said hypotheses are no longer satisfied, and in particular once the gain has been varied, the link rating is no longer the nominal rating but rather a downgraded rating as compared to the nominal rating, causing deterioration of the receive signal-to-noise ratio and therefore deterioration of the receive error rate (prior to error corrector decoding).

Digital information transmission theory shows that the receive error rate, i.e. the ratio between the number of incorrect bits following the decision operation effected at the receiving end to reconstitute said information and the total number of bits received, is related to the signal-to-noise ratio prior to said decision operation, at least assuming a Gaussian distribution of the noise (see the above reference work, for example).

The error corrector code used in the system according to the invention can produce a final error rate, i.e. an error rate after error corrector decoding, which does not exceed the maximum error rate specified by the user. The characteristic parameters of the error corrector code and in particular its correction capacity must therefore be determined accordingly, by the usual rules.

The error rate $\epsilon'$ at the output of the error corrector decoding means is related to the error rate $\epsilon$ at the input of the error corrector decoding means by an equation of the type:

$$\epsilon' = \frac{1}{n} \sum_{i=t+1}^{n} (i+t) C_n^i \epsilon^i (1-\epsilon)^{n-i}$$

in which "n" and "t" are parameters which define the error corrector code employed, "n" denoting the code word length and "t" denoting the number of errors that can be corrected per code word (see for example "Codes correcteurs Théorie et Applications" ("Corrector codes—theory and applications")—A. Poli, L. Huguet—MASSON—Logique mathématiques informatique).

Gain control instructions and instructions to disconnect amplifier equipment(s) from the link, respectively denoted $C_{1,i}$ and $C_{2,i}$ for the amplifier equipment $10_i$ in the figures, could come from a terminal equipment of said link, the latter receiving, in order to produce the signals, information from said amplifier equipments enabling deterioration of their transmission quality to be detected, such detection being conventional and not constituting any part of the present invention.

There is claimed:

1. A system for re-establishing the transmission quality of a digital information transmission link, having a send end terminal, a receive end terminal, and a plurality of amplifier units, in the event of failure of one or more of said amplifier units, comprising:

means for varying the gain of at least one of said amplifier units in order to compensate for deterioration of the receive signal-to-noise ratio, following failure of at least one other amplifier unit, error corrector coding means disposed at the send end of said link for applying an error correcting code to the digital information to be transmitted; and error corrector decoding means disposed at the receive end of said link and responsive to said error correcting code for operating on the received digital information;

wherein said error corrector code used by said error corrector coding means and by said error corrector decoding means is operative to reduce or even eliminate residual errors at the receiving end associated with residual deterioration of the receive signal-to-noise ratio not compensated by said means for varying the gain.

2. The system according to claim 1 wherein at least one of said amplifier units comprises means for disconnecting said amplifier unit from said link in the event of failure of said amplifier unit.

* * * * *